United States Patent Office 3,491,180
Patented Jan. 20, 1970

3,491,180
PROCESS AND COMPOSITION FOR POLYAMIDE FIBERS BASED ON CARBOXY TERMINATED POLYESTERS AND DIISOCYANATES
Wilhelm Thoma, Cologne-Flittard, and Heinrich Rinke, Leverkusen, Germany, assignors to Farbenfabriken Bayer Aktiengesellschaft, Leverkusen, Germany, a corporation of Germany
No Drawing. Filed Mar. 30, 1967, Ser. No. 626,984
Claims priority, application Germany, Mar. 31, 1966, F 48,820
Int. Cl. D01d 5/10; D01f 7/00, 3/10
U.S. Cl. 264—210  4 Claims

ABSTRACT OF THE DISCLOSURE

Monofils are prepared from polyesteramides prepared from carboxyl terminated polyesters having a molecular weight of from 3000 to 6000 and a melting point above 220° C., and an aliphatic or cycloaliphatic diisocyanate by melt spinning into a cooling medium, stretching while hot and heat setting.

---

This invention relates to polyesteramide monofils and to a method of preparing the same. More particularly, it relates to polyesteramide monofils which exhibit high strength, outstanding flexibility and foldability, a high modulus of elasticity and a high affinity for dyes.

It is therefore an object of this invention to provide monofils having improved properties. It is another object of this invention to provide polyesteramide monofils having improved modulus of elasticity, bending moment and relative stiffness in flexure as compared with polyurethane and polyamide monofils.

It has been heretofore known that foils for film substrates can be prepared from polyesteramides, which are obtained by reacting diisocyanates and high-melting polyesters containing terminal carboxyl groups. In general, the requirements regarding the mechanical and physical properties which have to be satisfied by monofils or bristles differ from those made of films. The modulus of elasticity and melting point, the bending moment and relative stiffness in flexure are all intended to be as high as possible, while the swellability must be a low as possible in monofils and the abrasion resistance and affinity for dyes satisfactory.

The foregoing objects and others which will become apparent from the following description are accomplished in accordance with the invention generally speaking by providing polyesteramide monofils having the repeating units

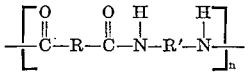

wherein R is the residue remaining after removing the carboxylic acid groups from a linear carboxylic acid terminated polyester having a molecular weight of from about 3000 to about 6000 and a melting point of at least about 180° C., R' is the residue remaining after the removal of the NCO groups from an aliphatic or cycloaliphatic diisocyanate and n is an integer which establishes the molecular weight of the polyesteramide in the fiber-forming range, the monofils having a melting point of at least about 120° C. The monofils are prepared in accordance with the invention by spinning a polymer as described above and stretching the thus-formed filament at a temperature above the glass transition point of the polymer. This stretching operation is preferably carried out in boiling water. The modulus of elasticity, bending moment, and relative stiffness in flexure of the polyesteramide monofils in accordance with the invention are far superior to the corresponding properties of both polyurethane and polyamide based monofils.

The tendency of polyesteramide monofils to swell superficially is lower than that of polyurethane and polyamide monofils, with the result that articles produced from polyesteramide monofils have greater dimensional stability than their counterparts produced from polyurethane- and polyamide-based monofils. Compared with polyurethane and polyamide monofils, polyesteramide monofils have lower elongation, resulting in better dimensional stability.

The melting points of the polyesteramides to be used in accordance with the invention are preferably in the range 220 to 240° C. and are therefore higher than those of polycaprolactam, being some 40 to 60° C. higher than the melting point of known polyurethanes, for example, a polyurethane of 1,6-hexane diisocyanate and 1,4-butanediol. In addition, the articles produced from polyesteramides show a good affinity for dyes.

The number of times polyesteramide monofils can be creased or folded before failure is greater than that of polyester monofils, so that finished articles manufactured from polyesteramide monofils, such as slide fasteners and screen cloths, can be expected to break far less often.

The polyesteramides are prepared by reacting carboxylic acid terminated polyesters having melting points above 180° C. and molecular weights within the range of from about 3000 to about 6000 with aliphatic or cycloaliphatic diisocyanates. The isocyanate is reacted with the polyesters in the ratio of from about 1:1 to about 1:1.2 and preferably about 1:1.05. The polyesters having suitable melting points are prepared by reacting aromatic dicarboxylic acids or anhydrides or esters with glycols. Optionally nonaromatic dicarboxylic acids may be used in admixture with the aromatic dicarboxylic acid. Any suitable aromatic dicarboxylic acid and anhydride or ester may be used such as, for example, terephthalic acid, isophthalic acid, symmetrically substituted dicarboxyphenyl compounds, bibenzoic acid, bis(p-carboxyphenyl) methane, p-oxy(p-carboxyphenyl) benzoic acid, ethylene - bis (p-oxybenzoic acid), ethylene-bis-p-benzoic acid, tetramethylene-bis(p-oxybenzoic acid), 1,5-naphthalene dicarboxylic acids, 2,6 - naphthalene dicarboxylic acids, 2,7-naphthalene dicarboxylic acids and the like. The ester-forming derivatives which may be used include the esters such as methyl, ethyl, phenyl and monomeric ethylene glycol esters. Any suitable aliphatic dicarboxylic acid may be used in admixture with the aromatic dicarboxylic acid such as, for example, adipic acid, succinic acid, methyladipic acid, oxalic acid, malonic acid, glutaric acid, pimelic acid, suberic acid, azelaic acid, sebacic acid, maleic acid, fumaric acid and the like. Any suitable glycol or mixture of glycols can be used in the preparation of suitable polyesters such as, for example, ethylene glycol, propylene glycol, isobutylene glycol, 1,4-buteneglycol, 1,5-pentamethylene glycol, 2,2 - dimethyltrimethylene glycol, hexamethylene glycol, decamethylene glycol and the like.

Any suitable aliphatic or cycloaliphatic diisocyanate can be used in reaction with the above described polyesters to prepare the polyesteramides in accordance with the invention such as, for example, tetramethylene diisocyanate, pentamethylene diisocyanate, hexamethylene diisocyanate, xylylene diisocyanate, cyclohexalene diisocyanate, 1-methyl-2,4-diisocyanato cyclohexane, 2,6-diisocyanato hexane and isomeric mixtures of 2,4 and 2,6, 1-methyl diisocyanato, cyclohexane, 4,4'-dicyclohexylmethane diisocyanate, dicyclohexylmethylmethane, 4,4'-diisocyanate and the like.

Polyesters of molecular weight 800 to 6,000, preferably 1,800 to 4,500, which are used as starting materials, are obtained by known methods, for example, by esterification of dicarboxylic acids with dihydric alcohols, by ester interchange of alkyl or hydroxyalky esters of dicarboxylic acid with dihydric alcohols or from dicarboxylic acid chlorides and dihydric alcohols.

The melting point of the polyesters should be above 180° C., generally from 180° to 260° C. and preferably from 200° C. to 240° C.

It is especially advantageous for the ratio of dihydric alcohol to dicarboxylic acid in the esterification process to be such that the resulting polyester contains predominantly or exclusively carboxyl end groups. The polycondensation products obtained from the reaction with diisocyanates have greater thermostability than those prepared from polyesters which contain predominantly OH end groups.

However, polyesters containing predominantly OH end groups can be converted into polyesters containing predominantly or exclusively carboxyl end groups by reacting them with approximately equivalent quantities of a dicarboxylic acid anhydride.

Representative examples of suitable aromatic acids which may be used as such or in the form of their polyester-forming derivatives, are: terephathalic acid, isophthalic acid, diphenyl-4,4'-dicarboxylic acid, diphenyl sulfone-4,4'-dicarboxylic acid, diphenyl-ether-4,4'-dicarboxylic acid, benzophenone-4,4'-dicarboxylic acid, naphthalene 2,6- and 2,7-dicarboxylic acid and ethane diphenyl ether-4,4'-dicarboxylic acid and others. If desired, up to about 30 mol percent of other carboxylic acids, such as non-aromatic carboxylic acids may be used; for example, succinnic acid, adipic acid, sebacic acid, ether dipropionic acid, 1,4-cyclohexane dicarboxylic acid, 4-carboxyphenyl-propionic acid, 1,4-phenylene ether diacetic acid and 1,3-phenylene ether dipropionic acid and others. In addition to ethylene glycol, up to 30 mol percent of other glycols may be used if desired, e.g. propane-1,3-diol, butane-1,4-diol, hexane-1,6-diol, decane-1,10-diol, 2,2-dimethylpropane-1,3-diol, diglycol, dithiodigylcol, xylene-1,3-glycol or 1,4-glycol and 1,4-bis-hydroxymethyl cyclohexane.

The following dicarboxylic acid anhydrides may, for example, be used to convert polyesters that contain mainly hydroxyl end groups into polyesters containing mainly carboxyl end groups: maleic anhydride, succinic anhydride, glutaric anhydride and phthalic anhydride. A specific example of preparation is as follows:

Approximately 3728 parts of dimethyl terephthalate and about 2600 parts of ethylene glycol are heated with about 0.4 part of lead oxide for 12 hours at a temperature between about 165 and 215° C. with stirring, in a nitrogen atmosphere. The methanol evolved from the reaction is continuously distilled off through a small column. When about 1200 parts of methanol has distilled off, 700 parts of adipic acid are added to the reaction mixture and the mixture is reacted for about 3 hours at a temperature of about 230° C. at a pressure of about 0.1 mm. Hg. The resulting copolyester melts at a temperature of between about 205° to 210° C. and has a molecular weight of 3,300.

The polyesteramides prepared as above can be fed to the melt-spin stage in granulate form. The granulate can have incorporated therein conventional additives such as dyes, pigments, stabilizers, brighteners, and the like. A preferred method of melt-spinning the fibers in accordance with this invention is by working the material in screw extruders followed by spinning pumps.

The monofils are stretched above the glass temperature, preferably at temperatures from 60 to 120° C., particularly in boiling water, and then fixed at 120 to 160° C., particularly at 130 to 150° C. The monofils could even be fixed after they have been formed, for example, into slide fastener coils. The plastic monofils are particularly suitable for the production of slide fasteners and screen cloths.

The invention is further illustrated but not limited by the following examples in which parts are by weight unless otherwise specified.

EXAMPLE 1

A polyesteramide granulate (MP. 228–233° C., K-value 55.0), prepared by reacting a polyester obtained from dimethyl terephthalate and a mixture of ethylene glycol and 1,4-butanediol with glutaric acid anhydride, and by further reacting the polyester containing terminal COOH-groups with 1,6-hexane diisocyanate, is spun into a bristle by means of a spinning pump mounted near the bottom valve of an autoclave (1.2 ml./rev., 10 r.p.h.) after an increase in pressure of 5 atmospheres nitrogen. (One-hole nozzle 0.8 mm. in diameter.) The monofilament bristle is chilled by being spun into a water tank (10 to 12° C.) and then wound up at 55 meters per minute. The bristle is stretched in boiling water into which it is introduced at a speed of 10 meters per minute (stretching ratio 5.5, stretching force 0.64 g./den). The bristle is fixed on a 1.1 meter-diameter heatable drum at a surface temperature of 140° C. The bristle is unwound from the drum at 35 meters per minute so that, where there are 50 loops of bristle around the drum, the residence or contact time is 5 minutes.

The following table shows the properties of the polyesteramide bristle in comparison with those of a bristle of polyurethane (hexane diisocyanate/butanediol) and polyamide (polycaprolactum).

| Properties | Polyesteramide | Polyurethane | Polyamide |
|---|---|---|---|
| Diameter (mm.) | 0.18 | 0.21 | 0.18 |
| Denier | 343 | 392 | 297 |
| Elongation at break, percent | 12.4 | 23.5 | 24.2 |
| Number of folds before failure | 100 | 220 | 560 |
| Bending moment, cm. g. | 1.02 | 0.57 | 0.22 |
| Relative stiffness in flexure, percent | 650 | 220 | 120 |
| E-modulus (kg./mm.$^2$) (flex/swing method) | 1,460 | 780 | 395 |
| Melting point, ° C. | 228–232 | 180–183 | 215–21 |

The table shows that bending moment, stiffness and flexure and E-modulus of the polyesteramides are far superior to those of the polyurethane and polyamide.

EXAMPLE 2

A polyesteramide granulate (M.P. 215–220° C., K-value 53.5) prepared by reacting a polyester derived from dimethyl terephthalate and ethylene glycol with adipic acid, and by further reacting this polyester containing terminal carboxyl groups with 1,6-hexane diisocyanate, is spun into a monofil by means of melt-spinning apparatus and stretched (1:5.2). The heat-setting is effected at 140° C. The bristle thus obtained has an E-modulus of 1150 kg./mm.$^2$ at 20° C. (measured by the flex-swing method).

The melting points of the polyesters were determined by the method described by Kofler. (See L. Kofler, W. Kofler, Mikrochem. 34 (1949–1950) pages 374–381.)

It should be understood that the examples are for the purpose of illustration and not limitation and that any of the polyesters or diisocyanates set forth above may be used throughout the examples for the specific compounds set forth therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What we claim is:
1. A polyesteramide monofilament with the repeating units

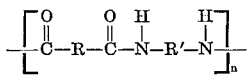

wherein R is the residue remaining after removing the carboxylic acid groups of a linear carboxylic acid terminated polyester having a molecular weight of from about 3000 to about 6000 and a melting point from about 180° C. to 260° C.; R' is the residue remaining after removal of the NCO groups from an aliphatic or cycloaliphatic diisocyanate, and $n$ is an integer which establishes the molecular weight of the polyesteramide in the fiber forming range; said filament having a melting point greater than 220° C.

2. The polyesteramide of claim 1 wherein the $n$ has a value such that the molecular weight of the polymer is from about 10,000 to about 30,000.

3. Process for the production of monofilaments which comprises melt spinning the polyesteramide polymer of claim 1, cooling the monofilaments, stretching the monofilaments at a temperature above the glass transition temperature, and heat setting the monofilaments.

4. The process of claim 3 wherein the monofilament is stretched in boiling water.

References Cited

UNITED STATES PATENTS 3,357,954  12/1967  Kirkaldy _____ 260—75

OTHER REFERENCES

Saunders et al.: Polyurethanes, vol. I, Interscience, New York (1962), p. 264.

DONALD E. CZAJA, Primary Examiner

H. S. COCKERAM, Assistant Examiner

U.S. Cl. X.R.

260—75

UNITED STATES PATENT OFFICE
CERTIFICATE OF CORRECTION

Patent No. 3,491,180                      January 20, 1970

Wilhelm Thoma et al.

It is certified that error appears in the above identified patent and that said Letters Patent are hereby corrected as shown below:

Column 1, line 44, "be a low as" should read -- be as low as --. Column 6, list of References Cited, add the following references:

| | | | |
|---|---|---|---|
| 3,029,226 | 4/1962 | Kessler et al. | 260-77.5 |
| 3,047,909 | 8/1962 | Boyer | 18-48 |
| 3,078,257 | 2/1963 | Rinke et al. | 260-77.5 |
| 3,174,949 | 3/1965 | Harper | 260-75 |
| | | FOREIGN PATENTS | |
| 150,604 | 1/1951 | Australia | |

Signed and sealed this 1st day of December 1970.

(SEAL)

Attest:

Edward M. Fletcher, Jr.                  WILLIAM E. SCHUYLER, JR.

Attesting Officer                            Commissioner of Patents